United States Patent [19]
Mosley

[11] 3,874,098
[45] Apr. 1, 1975

[54] HELIOCENTRIC-GEOCENTRIC ORRERY PROJECTOR

[76] Inventor: Kenneth C. Mosley, 224 Murphy St., Grand Rapids, Mich. 48706

[22] Filed: Oct. 15, 1973

[21] Appl. No.: 406,555

[52] U.S. Cl............................ 35/42.5, 35/45, 353/11
[51] Int. Cl. .......................................... G09b 27/02
[58] Field of Search .......... 35/42.5, 43, 45; 353/11, 353/12, 69

[56] References Cited
UNITED STATES PATENTS

| | | | |
|---|---|---|---|
| 1,616,736 | 2/1927 | Bauersfield | 35/42.5 |
| 2,483,216 | 9/1949 | Marshall | 35/42.5 |
| 2,947,184 | 8/1960 | Olson | 74/69 |
| 3,074,183 | 1/1963 | Frank | 35/45 |
| 3,286,536 | 11/1966 | Hallmann | 74/69 X |
| 3,363,507 | 1/1968 | Brandon | 35/42.5 |
| 3,571,954 | 3/1971 | Frank | 35/42.5 |
| 3,589,035 | 6/1971 | Vickery | 35/42.5 |
| 3,753,300 | 8/1973 | Mosley | 35/42.5 |

*Primary Examiner*—Wm. H. Grieb
*Attorney, Agent, or Firm*—Price, Heneveld, Huizenga & Cooper

[57] ABSTRACT

Two image projectors are mounted on a subframe movably mounted on a support. The first image projector is stationary on the subframe while the second is movably driven such that the image projected by it describes orbital movement about the stationary image on a screen. The subframe is also selectively driven to cancel out the movement of said second image and to impart movement to the first image such that the first image movement describes orbital movement about the second image on the screen. Preferably, a plurality of other projectors are movably mounted on the subframe whereby an orrery is provided which is capable of either copernican (heliocentric) operation or Tychonic (geocentric) operation.

20 Claims, 4 Drawing Figures

HELIOCENTRIC-GEOCENTRIC ORRERY PROJECTOR

BACKGROUND OF THE INVENTION

I. Field Of Invention

This invention relates to an apparatus for projecting images simulating orbital movement and, more particularly to an orrery projector of the type described in U.S. Pat. No. 3,753,300 issued to Applicant on Aug. 21, 1973, which reference is specifically incorporated herein for reference.

II. Description Of The Prior Art

An orrery projector of the type described in the above identified patent incorporated herein by reference simulates orbital movement in accordance with the teachings of Nicholas Copernicus. Copernicus, around the early period of the 16th century suggested that the sun was at the center of the planetary system and wrote a great book setting forth the details of this system showing calculations of its size, etc., and predicting tests. After his death, this view spread although it was not universally accepted for a long time. Today, the Copernican system (heliocentric) is universally accepted.

Tycho Brahe late in the 16th century with knowledge of Copernicus' suggestion, developed a theory wherein it was postulated that the sun rotated about the earth while the remaining planets rotated about the sun. This is known today as Tycho Brahe system (geocentric) and although believed to be invalid, is geometrically consistent with observed data as well as the Copernicus system.

Part of the difficulty in the days of these two great astronomers were the observed movement of the planets in epicycloids. An observer watching the movements of the planets noticed, for example, that Jupiter apparently wags to and fro as it goes around marking an epicycloid among the stars. The various theories developed by Copernicus and Tycho Brahe and their explanation for the planetary epicycloids need not be developed in depth herein since it is well understood to those skilled in this art.

Heretofore, Applicant is unaware of an orrery projection mechanism which will accomplish the duplication of the movement of, for example, the six inner planets — Mercury, Venus, Earth, Mars, Jupiter and Saturn — around the sun in a relatively simple and inexpensive device capable of accurate projection in the smallest or largest planetariums known which device will also switch from the heliocentric (Copernican mode) to the geocentric (Tychobrahic mode). As set forth in U.S. Pat. No. 3,753,300 incorporated herein by reference, orrery projection is preferred in many respects over a conventional planetarium since it provides the viewer with an image of the earth's solar system and sun with the earth's relative movement included as opposed to a view from the earth itself. This is quite stimulating to the observers since it gives the viewer a different perspective on how the earth fits into its solar system. The advantage is obvious, of course, if such a projector can be transformed by the flip of a switch into an orrery projector depicting geocentric movement wherein movement of the earth is stopped while the sun rotates thereabout with the remaining planets rotating about the sun.

In view of the foregoing, there is an overwhelming need in this art for an improved image projecting device capable of providing alternate orbital projecting functions which device remains relatively simple so that the cost of such a device is not prohibitive.

SUMMARY OF THE INVENTION

In accordance with the invention, a subframe is movably suspended from a support frame and first and second image projecting means are mounted to the subframe. The first image projector means is stationary with respect to the subframe while the second image projector means is movably mounted on the subframe and includes a first drive means for moving the second image projector means whereby the image projected by the said second image projector means describes an orbital ellipse about the first stationary image on a screen. The second means is cooperative with the subframe whereby the subframe is held in a first mode wherein it is held stationary relative the support frame and a second mode wherein the subframe is moved relative the support frame such that the movement of the second image on the screen is stopped while the first image describes an orbital ellipse about the second image.

In the preferred embodiment, the second image projector means and associated drive means simulates movement of the earth about the stationary sun image simulated by the first image projector means. The subframe is universally mounted to the support frame and a second drive means cooperative with the earth projector drive means to provide an identical cancelling output. This second drive means includes a cam follower selectively engageable with a conical cam such that when the cam is moved into abutment with the cam follower, the latter drives the subframe elliptically but in opposite phase to the driving of the earth projector so that the light projected therefrom is concentrated on a single locus on the screen. Simultaneously therwith, the conical movement of the subframe causes the light projected from the sun projector to move in orbital elliptical fashion about the stationary image of the earth. It will be appreciated that if other light image projector means are utilized to simulate, for example, the movement of the remaining inner planets, they will continue to perform their simulated movement about the sun all of which are being operated in simulated movement about the stationary earth image in geocentric fashion.

In yet narrower aspects of the invention, disengagement of the second drive means causes a second cam follower to stationarily seat in a second conical cam and properly reposition the subframe relative the support frame causing the two to be stationary relative each other such that the heliocentric movement is provided wherein the earth projector and all other projectors simulate the movement about the stationary sun projector. Yet narrower aspects of the invention comprise a unique actuator mechanism which causes the subframe to automatically switch from the geocentric mode to the heliocentric mode or vice versa.

In yet further aspects of the invention, the projector means are preferably driven in accordance with the drive described in U.S. Pat. No. 3,753,300 previously identified and incorporated herewith. The output gear driving the earth projector is preferably mechanically linked to a similar output for driving the subframe in opposite phase so that when the device is actuated for heliocentric movement, the earth projector and subframe are mechanically interlocked for oppositely phased orbital movement such that the earth projector light image is constantly and positively aimed at a stationary locus on the screen.

The advantages of the type of projector summarized herein are significant. A very economically priced projector is provided which provides a unique stimulating source of study. The orbital movement of the planets about the sun can be viewed selectively between the heliocentric and geocentric mode merely at the flip of a switch. All of this is achieved in a device having the capabilities of my earlier invention referred to hereinabove.

DESCRIPTION OF THE PREFERRED EMBODIMENT

U.S. Pat. No. 3,753,300 identified previously and incorporated herein by reference illustrates an orrery projector which projects light image movement on a screen simulating movement of the six inner planets — Mercury, Venus, Earth, Mars, Jupiter and Saturn — elliptically about the sun. Such movement is in accordance with the accepted postulations of Nicholas Copernicus referred to hereinafter as the heliocentric mode. In the preferred embodiment of the patent referred to, the sun projector was held stationary on a subframe while the remaining projectors were movably suspended by gimbal rings and driven by a unique drive mechanism to cause orbital elliptical movement of the projected light images about the stationary sun image. The subframe was adjustable pivotally relative the support frame but fixed relative thereto during operation.

Figure 1:
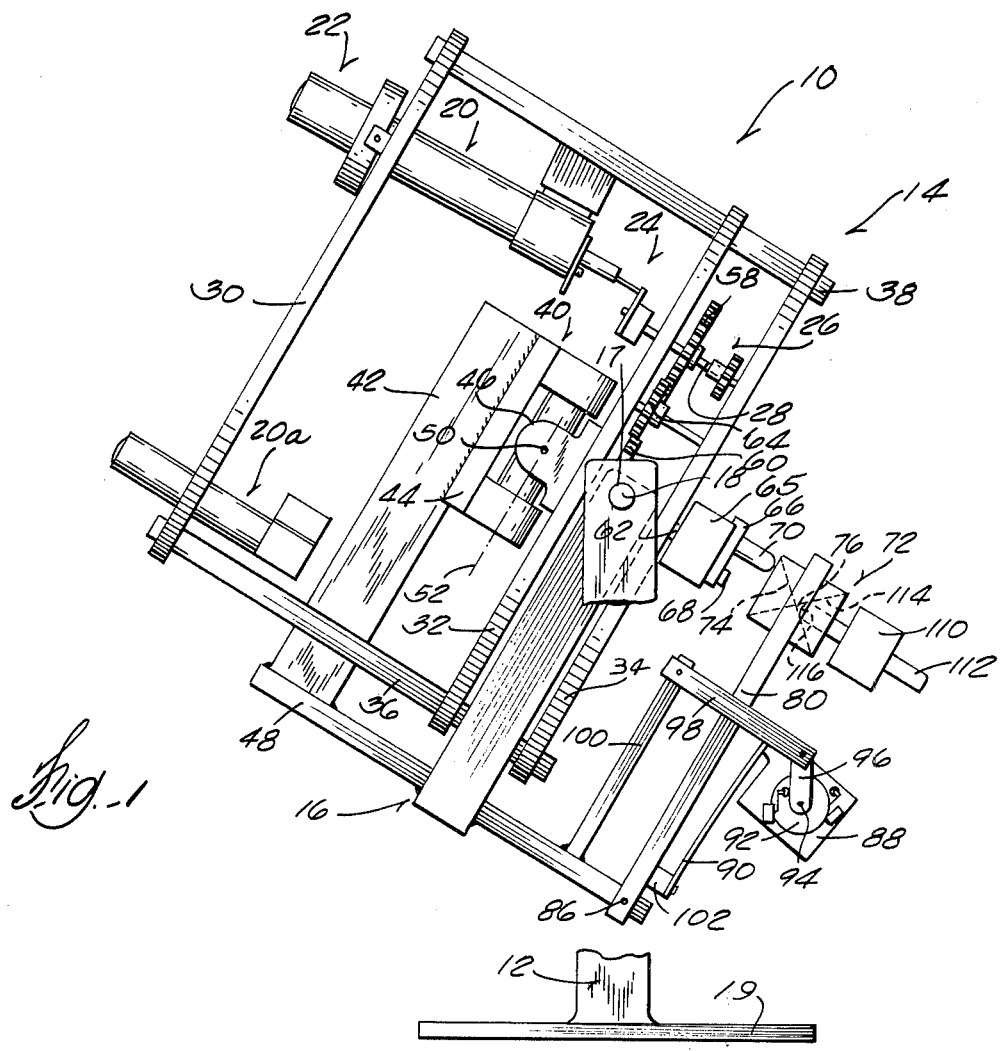
FIG. 1 is a fragmentary side elevation view of the orrery projector of my invention illustrated for operation in the heliocentric mode.
Figure 4:
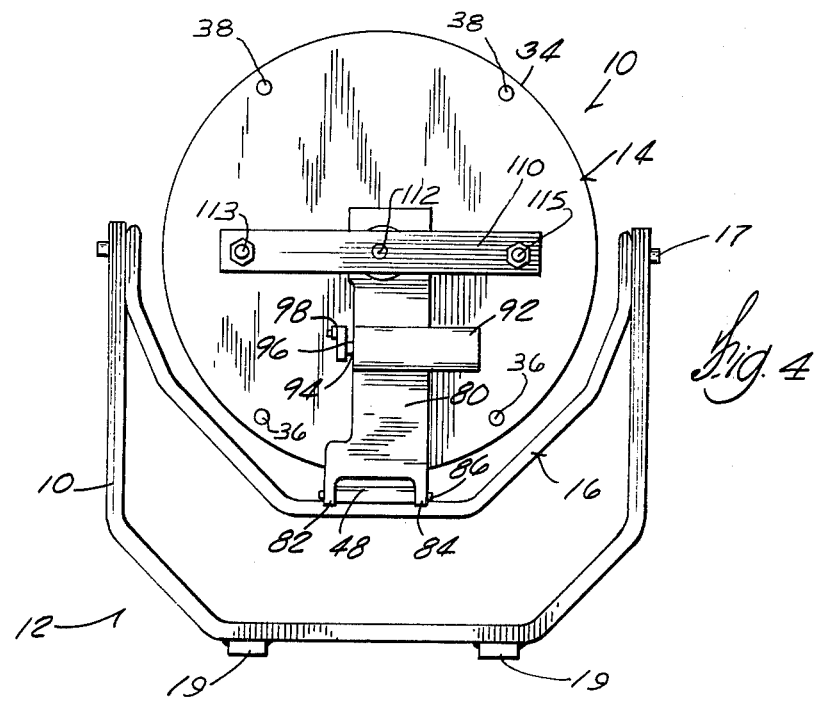
FIG. 4 is a fragmentary rear elevation view of the orrery projector illustrated in FIGS. 1-3.

Referring now in detail to FIG. 1, an orrery projector 10 similar to that illustrated in the aforementioned patent is shown having a support frame 12 attached to a subframe 14. Support frame 12 includes an intermediate frame 16 which is pivotally adjustable about an axis 18 to permit overall tilt adjustment when setting up the projector. Intermediate frame 16 and support frame 12 however are fixed stationary with respect to each other during operation. Reference to FIG. 4 illustrates the overall U-shape of intermediate frame 16 pivotally anchored by screws 17 to the overall U-shaped base of the support frame 12, the latter having legs 19.

Two image projectors 20 and 20a are mounted on subframe 14 and for purposes of this disclosure are intended to project light beams onto a screen (not shown) to simulate in the heliocentric mode, orbital elliptic movement of the earth about the sun. Projector 20 is the earth projector and is mounted pivotally to subframe 14 by a gimbal arrangement 22, projector 20 being driven in elliptical fashion by a drive 24 through a gear means 26. The operation of drive 24 is described in detail in U.S. Pat. No. 3,753,300 as well as the overall gear train 26. It will be understood that the motivation for movement of drive 24 through gear train 26 provides rotation of shaft 28 at a desired speed for driving the drive 24.

The projector 20a projects the sun image and is mounted stationarily to subframe 14. Subframe 14 includes a plurality of generally parallel spaced circular plates 30, 32 and 34 (FIGS. 1 and 4) anchored together by a plurality of longitudinally extending radially spaced rods 36 and 38. With the projector held in the position illustrated in FIG. 1 as will be described hereinafter, movement of earth projector 20 about gimbal arrangement 22 will project an image onto a screen which rotates orbitally about the stationary sun image projected by projector 20a whereby the movement of the earth image simulates orbital movement about the sun image in accordance with Kepplers' Second Law. The remaining projectors illustrated and described in the incorporated reference are not shown in these drawings for better clarity.

Subframe 14 (and the projectors mounted on it) are pivotally supported by support frame 12 about a universal joint 40. A post 42 is welded or affixed by mechanical fasteners to one side 44 of universal joint 40 while the other side 46 is anchored to plate 32 of subframe 14. Post 42 is welded to a support arm 48 in turn welded near its center to the U-shaped intermediate frame 16 which as described previously is adjustably anchored at 18 to the base portion of support frame 12. The universal joint thus provides universal movement of subframe 14 about support frame 12 simultaneously about perpendicular axes 50 and 52. Universal joint 40 illustrated is very similar to a vehicular universal joint and analogous to gimbal arrangement 22 permits simultaneous joint rotation of the two related parts (subframe 14 and support frame 12).

Figure 2:
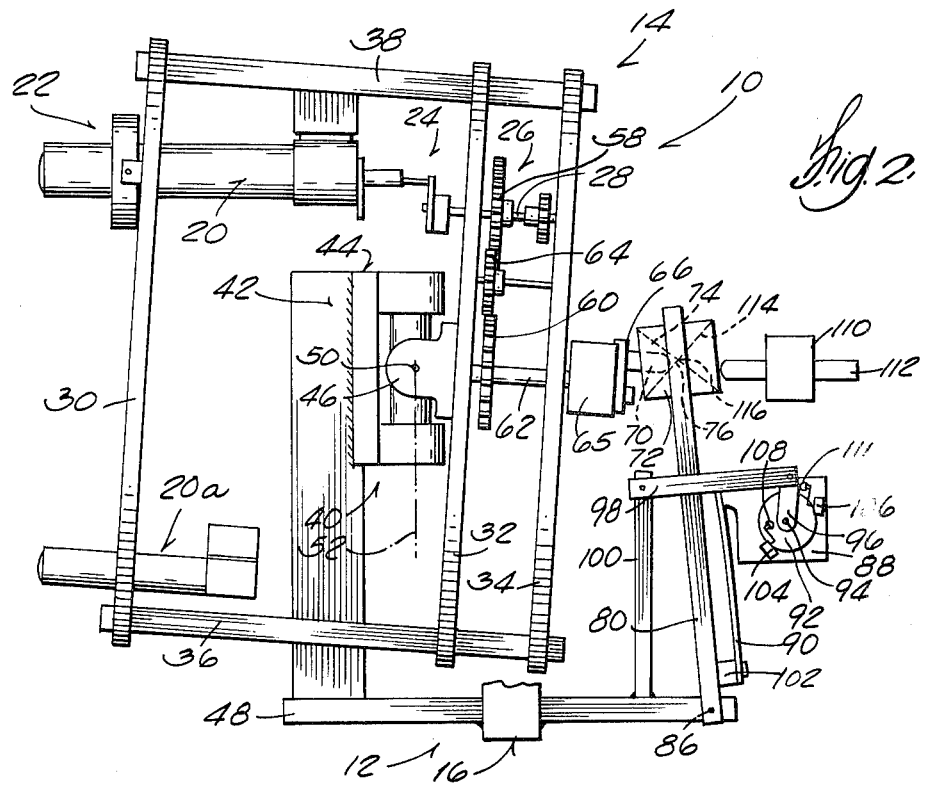
FIGS. 2 and 3 are fragmentary side elevation views similar to FIG. 1 illustrating the orrery projector operable in the geocentric mode, FIGS. 2 and 3 representing opposite phases from each other.
Figure 3:
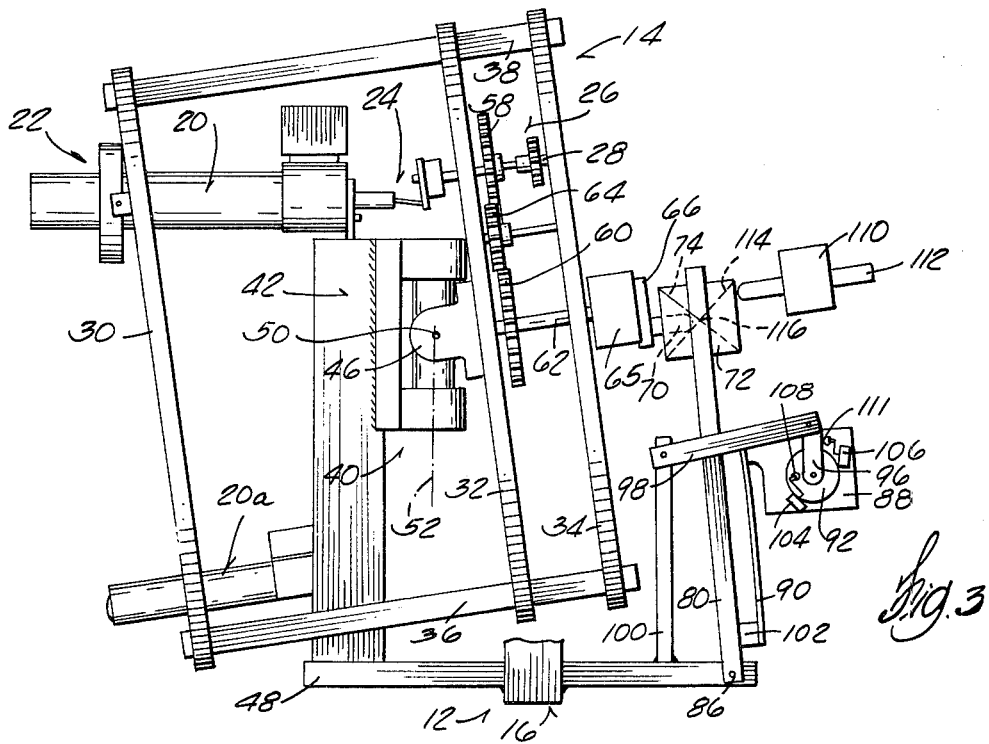

Referring now to FIGS. 2 and 3 in addition to FIG. 1, the drive means 24 for earth projector 20 as mentioned includes a gear drive 26 comprising a shaft 28 which in effect provides an input for drive 24. The gear mechanism for driving shaft 20a is not described in detail, it being appreciated that it is well within the skill of the art to provide such an input as outlined in the incorporated patent. A gear 58 is mounted on shaft 28 and rotatable therewith. A similar sized gear 60 is likewise mounted on a shaft 62 intermediate plates 32 and 34 and in mesh engagement with gear 58 through an intermediate gear 64. Since gears 58 and 60 are identical in size and mesh spacing, intermediate gear 64 assures rotation of gear 60 at the identical rate as gear 58 in the same direction 180° out of phase. Affixed to the exterior end of shaft 62 is a block 65 to which is adjustably affixed an adjustable plate-like member 66 anchored to block 65 by a screw or the like 68. Block 65 and plate 66 rotate jointly with shaft 62 and gear 60 as it is driven as described by gear 58. An axially extending drive pin 70 is anchored to plate 66 and will be described hereinafter as a follower pin cooperative with a cam block 72 which will be described hereinafter. Cam block 72 includes a conically shaped cam surface 74 which drives follower pin 70.

Cam block 74 is mounted in juxtaposition with follower pin 70 for selective axial movement relative thereto into a first position wherein the cam block is out of engagement with follower pin 70 in which case, as will become more apparent, the orrery 10 is operable in the heliocentric mode as illustrated in FIG. 1. Cam block 72 however is movable into cooperative cam engagement with follower pin 70 as illustrated in FIGS. 2 and 3 wherein follower pin 70 is seated at the apex 76 of conical cam face 74 such that as shaft 62, block 65, plate 66 and pin 70 are driven rotatably, subframe 14 is rotated about the axes 50 and 52 simultaneously. The causation of this is the displacement between the axis of shaft 62 and the axis of pin 70 which extend in the same direction. The exact spacing is, of course, adjustable as a result of plate 66 and screw 68. Plate 66 preferably includes a slot therein (not shown) such that when screw 68 is loosened, the plate can be aligned as desired and then anchored by tightening fastener 68. Cam block 72 however when indexed into the cam engaging position is moved to cause pin 70 to move down the cam face from a position essentially at the periphery as illustrated in FIG. 1 to the apex 76 as illustrated in FIGS. 2 and 3. Once locked in this position, rotation of shaft 62 forces subframe 14 to move cyclically about universal joint 40. Referring to FIG. 1, assuming pin 70 is in the position shown and cam block 72 is moved into engagement therewith, pin 70 will be caused to slide down the slope of cam face 74 to its apex 76 during which time subframe 14 is moved or indexed into the geocentric mode.

Cam block 72 is securely anchored to an actuator arm or armature 80 pivotally anchored to the end of arm 48 opposite its securement to post 42. Referring to FIG. 4, the lower end of armature 80 includes a pair of extending arms 82 and 84 pivotally anchoring armature 80 to arm 48 by a pin 86. In this fashion, armature 80 is pivotally movable toward and away from follower pin 70.

Referring now to FIGS. 1-3, a bracket 88 is anchored to armature 80 by a spring means 90 preferably in the form of one or more leaf springs. A motor 92 is secured to bracket 88 and includes an output shaft 94 to which is mounted an arm 96 which rotates with shaft 92. A link 98 is pivotally secured to the end of arm 96 and pivotally anchored at its other end to a post 100 welded or otherwise secured to arm 48. Rotation of arm 96 into the position illustrated in FIG. 1 causes armature 80 to be moved essentially into position wherein cam block 72 is disengaged from follower pin 70. Tension is applied to spring 90 as illustrated which acts through its anchor block 102 to bias armature 80 and cam block 72 out of engagement with follower pin 70. Clockwise rotation of arm 96 from the position illustrated in FIG. 1 to that illustrated in FIGS. 2 and 3 however causes the spring to be urged in the opposite direction and pull armature 80 and hence cam block 72 into interferring or cam engaging association with follower pin 70 as described previously.

A pair of limit switches 104 and 106 limit the movement of arm 96 in that as it reaches the desired extension of its pivotal rotation, it will abut one of the limit switches to stop further rotation of shaft 94 by turning off motor 92. The actuation of motor 92 from either the heliocentric to the geocentric mode is selected by simply switching an appropriate switch on the panel controlling the orrery all of which is not shown and well within the skill of the art. Each limit switch 104 and 106 includes a sensor 108 and 111 respectively. Preferably, motor 92 rotates slowly such that as it passes through approximately 60° of travel as illustrated in the drawings, it takes approximately 5 seconds to change the orientation of the orrery projector from geocentric to heliocentric mode operation or vice versa. This lapse of time is preferred so that the operation of the entire orrery is not abruptly changed thereby minimizing any stress or vibration through abrupt movements on the entire orrery projector. The particular arrangement illustrated through the utilization of spring 90 also provides a damper on the entire actuation of the subframe into or out of geocentric operation thereby avoiding vibrations so that the transition as projected on the screen is smooth and clear.

Having described the basic mechanism, it will be appreciated in light of the foregoing, that through the actuation of motor 92, armature 80 causes engagement or disengagement of cam block 72 with follower pin 70 such that in the disengaged position, the operation of the orrery is heliocentric with the earth projector causing image movement about the stationary image of the sun. Movement of cam block 72 into engagement with pin 60 however causes rotational movement of subframe 14 about universal joint 40 in exactly the same opposite phase movement that earth projector 20 is moved by drive 24 such that at all times, the projection of the light image from projector 20 is directed at a single locus on the screen (not shown) even though the projector is at all times operating in rotation as a result of drive means 24. The 180° out of phase operation of subframe 14 however through cam follower drive 70 cancels the rotational effect of the earth image projected from projector 20 such that its apparent observation is stationary. It will be appreciated that the mechanical interconnection of the drive 24 and cam follower pin 70 assures identical cancellation or 180° out of phase operation.

Referring to FIG. 1, when subframe 14 is in the disengaged position as illustrated, subframe 14 would rotate randomly into a tilted position about either of axes 50 or 52 depending on the center of gravity of the entire projector. This would cause improper operation of the orrery in the heliocentric mode and therefore means are provided to assure proper indexing of subframe 14 to which are mounted the various Sun, Earth, and other related projectors. To accomplish this, an index block 110 is anchored to subframe 14 by bolts 113 and 115 (FIG. 4) which space the block as shown in FIGS. 1-3. In this fashion, it moves jointly with subframe 14. An indexing pin 112 is slidably secured to block 110 by a set screw or the like 114. The pin projects toward cam block 72 for selective engagement or disengagement with a conical cam face 114 identical to cam face 74 but inverted with respect thereto. During operation of the orrery in the heliocentric mode, the index pin 112 is seated at the apex 116 of cam face 114 thereby indexing subframe 14 into the position illustrated in FIG. 1. It will be appreciated that armature 80 interconnects the subframe to support frame 12 through spring 90, arms 96, 98, and post 100 which is anchored to arm 48. The interconnection is stationary when index pin 112 is seated in the apex 116 of cam face 114 formed in cam block 72. It will be further appreciated that when armature 80 is brought into this position illustrated in FIG. 1, it is disengaged from cam follower pin 70 so that the orrery projection is in the heliocentric mode with the subframe being locked into a stationary position so that the image projected from sun projector 20a is stationary on the screen (not shown) while the image projected by earth projector 20 moves in an orbital ellipse thereabout.

Actuation of motor 92 from the position illustrated in FIG. 1 to that in FIGS. 2 and 3 causes armature 80 to begin its interengagement with cam follower pin 70 which upon reaching apex 76 of cam face 74 provides complete disengagement from apex pin 112 so that subframe 14 is driven as described previously in the geocentric mode. The inverted cone shaped cam surfaces 74 and 114 thus selectively operate to either cause cyclical movement of subframe 14 when armature 80 is moved into the geocentric drive mode illustrated in FIGS. 2 and 3 or alternatively index subframe 14 in the proper stationary orientation with index pin 112 is locked into seated engagement with cam face 114 as illustrated in FIG. 1. It will be further appreciated that the adjustment of plate 66 and index pin 112 provides a means for accurately aligning the operation of the orrery upon installation.

OPERATION

In view of the foregoing, the operation of the orrery projector in either the heliocentric or geocentric mode should be obvious. When the orrery is operational, motor 92 and its drive arm 96 will be either in the position illustrated in FIG. 1 or that in FIGS. 2 and 3. Movement into either of these locations is caused by an appropriate circuitry and switch means on the control panel which is not shown nor described it being well-known in the art. Assuming the arm 96 of motor 92 is in the position illustrated in FIG. 1, armature 80 will be in the position illustrated wherein index pin 112 is seated within inverted cam face 114 at its apex 116. The tension applied to spring 90 imparts a moment force about armature 80 so that positive indexing of index pin 112 is assured. This locks subframe 14 to support frame 12 so that operation of the orrery projector simulates planatary movement about a stationary sun. While only the earth and sun projector are illustrated in the drawings, it will be appreciated that the remaining projectors utilized such as those illustrated in the patent incorporated herein by reference will simulate interplanatary movement about the sun. The drive block 65 and cam follower pin 70 are of course rotating through interconnected drive to the earth projector. However, cam follower pin 70 is free of cam block 72 so that this rotation imparts no affect on the operation of the orrery.

Actuation of armature 80 to the opposite mode is caused by appropriate switch manipulation causing motor 92 to rotate its drive arm 96 through approximately 60° of travel into the position illustrated in FIGS. 2 and 3. In this position, the spring force is causing momentary movement and urgency against armature 80 so that cam block 72 is pivoted toward subframe 14 into engagement with cam follower pin 70. Assuming cam follower pin 70 is in the position illustrated in FIG. 1, the initial contact will be on the periphery of cam face 74 but continued movement of armature 80 will cause rotation of subframe 14 into a position which will allow seated engagement of cam follower pin 70 at apex 76 of cam face 74. This is permitted by reverse phase movement of index pin 112 out of apex 116 of cam face 114 which will travel toward the periphery of cam face 114 into either of the positions illustrated in FIGS. 2 and 3.

FIGS. 2 and 3 illustrate two opposite positions of subframe 14 during its operation in the geocentric mode. It will be appreciated as described previously that the earth projector 20 is rotated constantly about gimbal arrangement 22 through its drive 24 which is supplied by gear means 26 through shaft 28. With subframe 14 however movably controlled in the geocentric mode, the displacement of cam follower pin 70 from the axis of rotation 60 illustrated by shaft 62 causes simultaneous rotation of subframe 14 about universal 40. Since gears 60 and 58 are interconnected for similar rotation at identical speeds, the effect of rotation of earth projector 20 through drive 24 is counteracted by the drive of subframe 14 through cam follower 70, wheel 65, shaft 62 etc. The rotation is exactly opposite to that of earth projector 20 such that although the apparent orientation of earth projector 20 will vary, its axis of projection is always centered on a fixed locus on the screen such that the image projected by it is stationary. FIGS. 2 and 3 thus illustrate two maximum positions of subframe 14 wherein the subframe is tilted upwardly as illustrated in FIG. 2 and downwardly as illustrated in FIG. 3. In these positions however the maximum up and down rotation of earth projector 20 is in the opposite phase so that when subframe 14 is tilted upwardly as illustrated in FIG. 2, earth projector 20 is tilted downwardly whereas when the subframe 14 is rotated downwardly to its maximum position as illustrated in FIG. 3, earth projector 20 is likewise rotated upwardly. The position of its drive means illustrates this in that drive 24 is at opposite phases in contravention of the opposite phases of the drive shaft 62, block 65, plate 66 and 70.

During operation in the geocentric mode, it will also be appreciated that the projection of the image from sun projector 20a will move orbitally about the stationary image of the earth projector and any remaining projectors such as those illustrated in the incorporated patent, will continue their operation orbitally about the sun thereby causing duplication of the geocentric theories of Tyco Brahe. Of significance also, the planetary epicycloids will also be accurately portrayed since orbital movement of the other planets will be consistent about the sun but will be affected by the subframe movement about the stationary earth image creating exact simulation of the Tyco Brahe system.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. Apparatus for projecting a moving image onto a screen comprising, in combination: a support; a subframe movably anchored to said support; first image projector means anchored to said subframe and movable therewith; second image projector means movably secured to said subframe; means for selectively anchoring said subframe to said support and releasing it for movement relative thereto; first drive means for said second image projector means such that when said subframe is stationary relative said support, the image projected by said second image projector means describes orbital movement about the stationary image projected by said first image projector means; and second drive means for said subframe such that when said subframe is movable relative said support, the movement of said subframe counteracts the movement of said second image projector means such that the image projected onto the screen is stationary and the image projected by said first image projector means describes orbital movement about said stationary second image.

2. Apparatus according to claim 1 wherein said second drive means includes a cam follower extending from said subframe and a cam movable between a first position out of engagement with said follower whereby said subframe is anchored relative said support and a second position wherein said follower is in active engagement with said cam causing said subframe to move relative said support.

3. Apparatus according to claim 2 wherein said subframe is movably mounted to said support by a universal joint means, said cam including a cam block having a conical cam face and an apex, said follower comprising a pin means spaced from an axis and rotatably driven about said axis whereby as said cam face is moved into engagement with said pin means, said pin means follows said conical cam face into index position with said apex causing said subframe to rotate simultaneously about a pair of axes.

4. Apparatus according to claim 3 wherein said first and second drive means are mechanically interconnected such that when said cam is in said second position, positive counter-rotation of said subframe relative to that of said second projector means is imparted.

5. Apparatus according to claim 4 wherein each of said first and second drive means includes a drive shaft, said drive means each including an identical sized gear on each drive shaft cooperatively associated with each other through an intermediate gear such that rotation of one drive shaft imparts identical counterrotation of the other.

6. Apparatus according to claim 1 wherein said means for selectively anchoring said subframe to said support and releasing it for movement relative thereto includes a cam follower extending from said subframe and fixed relative thereto, said cam follower being selectively engageable with a cam movable between a first position out of engagement with said cam follower whereby said subframe thru movable relative said cam follower whereby said is movable relative said support and a second position wherein said cam follower is cammed into seated engagement with said cam causing said subframe to be anchored relative said support.

7. Apparatus according to claim 6 wherein said cam includes a cam block having a conical cam face and an apex, said follower comprising a pin means anchored relative said subframe whereby as said cam face is moved into engagement with said second pin means, said second pin means follows said cam face into indexed position with said apex causing said subframe to be anchored relative said support.

8. Apparatus according to claim 1 wherein said second drive means includes a first cam follower extending therefrom and said means for selectively anchoring said subframe to said support and releasing it for movement relative thereto includes a second cam follower extending from said subframe and fixed relative thereto, said first and second cam followers being selectively engageable with first and second cam surfaces movable between a first position wherein said first cam follower is out of engagement with said first cam face and said second cam follower is in active engagement with said second cam face whereby said subframe is anchored relative said support and a second position wherein said first cam follower is in active engagement with said first cam face and said second cam follower is out of active engagement with said second cam face causing said subframe to move relative said support.

9. The apparatus according to claim 8 wherein said subframe is movably mounted to said support by a universal joint means, said second drive means includes a cam block, said first and second cam faces being formed in said cam block, said cam faces comprising conical shapes inverted with respect to each other each cam face having an apex whereby said second cam follower is indexed in said second cam face apex in said first position and said first cam follower is indexed in said first cam face apex in said second position, said cam followers being in active engagement respectively with said first and second cam faces when said cam faces are moved intermediate said first and second positions.

10. Apparatus according to claim 9 wherein said first and second followers are comprised of first and second pin means, said second pin means being spaced from and rotatable about an axis, said second pin means in said first position being seated in said second cam face apex for rotating said subframe about said universal joint means and in said second position, said first pin means is indexed in said first cam face apex anchoring said subframe relative said support.

11. Apparatus according to claim 9 wherein said apparatus further includes actuator means for moving said cam block between said first and second positions, said actuator means comprising an armature pivotally linked to said support frame, said cam block being anchored to said armature for pivotal movement therewith between said first and second positions.

12. Apparatus according to claim 11 wherein said actuator means further includes a post anchored at one end to said support frame, a spring means, one end of said spring means being anchored to said armature, a motor means anchored to the other end of said spring means, said motor means including a drive shaft and a drive arm extending radially from said shaft, and a linking bar interconnecting said drive arm to said post, actuation of said motor means causing said armature to move pivotally about said support causing said cam block to move between said first and second positions.

13. Apparatus according to claim 12 wherein limit switches are mounted on said motor means and engageable with said drive arm for automatically terminating the operation of said motor and movement of said armature as it reaches either of said first and second positions.

14. A planetarium arrangement comprising, in combination: a support frame; a subframe movably anchored to said support frame by a universal joint means; index means movable between first and second positions, said index means in said first position indexing said subframe securely to said support frame whereby said subframe is stationary relative said support frame, said index means in said second position permitting movement of said subframe relative said support frame about said universal joint means; a first projector means anchored to said subframe and including a first light source for projecting a first light beam image onto a screen; a second image projector means pivotally suspended from said subframe for pivotal movement relative thereto about first and second axes, said second image projector means including a second light source for projecting a second light beam image onto a screen; first drive means cooperative with said subframe for driving movement of said subframe circumferentially about a third axis, said first drive means being disengaged from said subframe when said index means in said first position; second drive means cooperative with said second projector means for driving movement of said second projector means circumferentially about a fourth axis, said first and second drive means being cooperatively associated with each other such that when said index means is in said first position, said first image is stationary on the screen and said second image moves on the screen relative said first image and when said index means is in said second position, said second image is stationary on the screen and said first image moves on the screen relative to said second image.

15. A planetarium arrangement according to claim 14 wherein said first and second axes are perpendicular to each other and said fourth axis is perpendicular to said first axis whereby the movement of said second image about said first image when said index means is in said first position describes an ellipse and the movement of said first image about said second image when said index means is in said second position describes an ellipse.

16. The planetarium arrangement according to claim 15 wherein a plurality of image projector means similar to said second image projector means are suspended from said support frame, each of said projector means being pivotal about first and second axes perpendicular to each other and including a light source projecting a light beam image onto a screen and drive means associated with said plurality of projector means for driving movement circumferentially about a third axis perpendicular to said first axis whereby the moving images projected on the screen describe an ellipse, the planetarium arrangement depicting heliocentric movement when said index means is in said first position and depicting geocentric movement when said index means is in said second position.

17. The planetarium arrangement according to claim 14 wherein said first drive means includes a first cam follower extending from said subframe and a first cam movable between a first position out of engagement with said first cam follower when said index means is in said first position, said first cam follower being in active engagement with said first cam when said index means is in said second position causing said subframe to move relative about said support frame to cancel the effective movement of said second image on a screen and said index means comprises a second cam follower extending from said subframe and fixed relative thereto, said second cam follower being selectively engageable with said second cam follower when said index is in said second position and a second position wherein said cam follower is in seated engagement with said second cam when said index means is in said first position.

18. The planetarium arrangement according to claim 17 whereby said index means comprises a cam block having a first conical cam face formed thereon engageable with said first cam follower and a second conical cam face formed thereon and inverted with relationship to said first cam face, said second cam face being engageable with said second cam follower.

19. The planetarium arrangement according to claim 18 wherein said planetarium further includes actuator means for moving said index means between said first and second positions, said actuator means including an armature pivotally secured to said support frame, said cam block secured to said armature, and means for automatically moving said armature and index means between said first and second positions.

20. The planetarium arrangement according to claim 19 wherein said first cam follower comprises a pin means rotatable about an axis spaced from and generally parallel to the axis of said pin means, said index means when positioned in said second position causing said pin means to be seated in the apex of said first conical cam face whereby said support frame is driven circumferentially about said third axis.

* * * * *

UNITED STATES PATENT OFFICE
CERTIFICATE OF CORRECTION

PATENT NO. : 3,874,098
DATED : April 1, 1975
INVENTOR(S) : Kenneth C. Mosley

It is certified that error appears in the above—identified patent and that said Letters Patent are hereby corrected as shown below:

Column 9, lines 44, 45;

delete "thru movable relative said cam follower whereby said"

Signed and Sealed this twenty-second Day of July 1975

[SEAL]

Attest:

RUTH C. MASON
Attesting Officer

C. MARSHALL DANN
Commissioner of Patents and Trademarks